Sept. 10, 1946.  G. M. CHARRIER  2,407,475
CATHODE RAY SWEEP CIRCUIT
Filed Feb. 25, 1942
*Fig. 1*
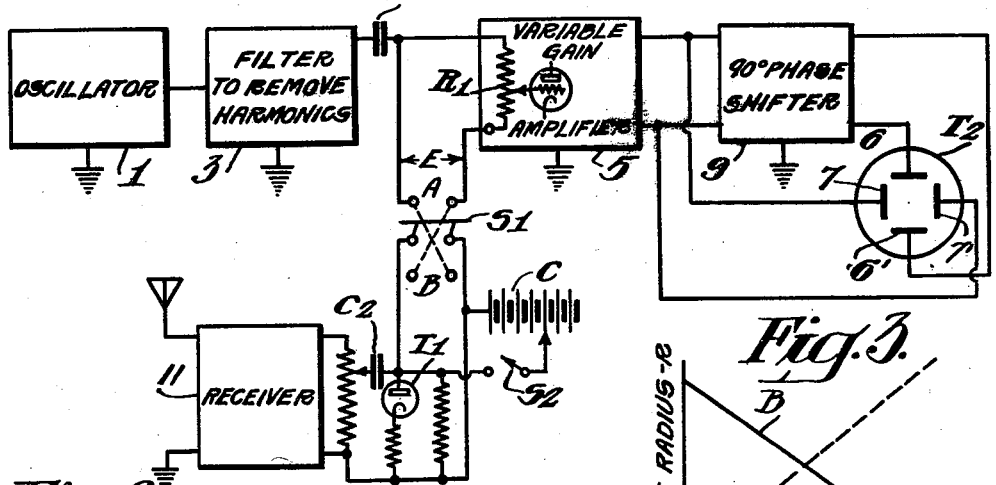
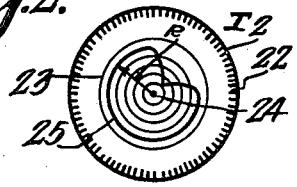
*Fig. 2.*
*Fig. 3.*
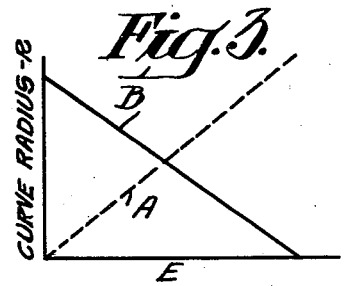
*Fig. 4.*
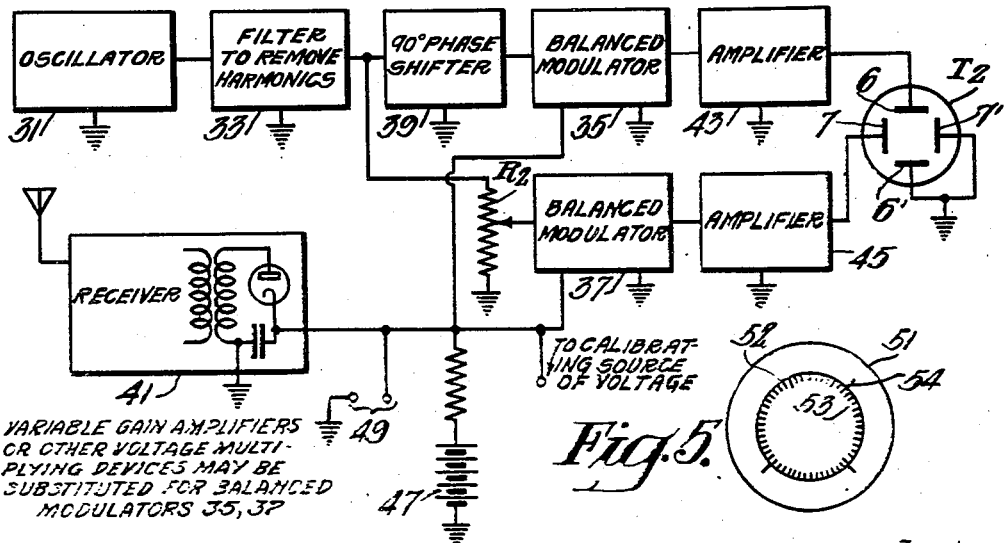
VARIABLE GAIN AMPLIFIERS
OR OTHER VOLTAGE MULTI-
PLYING DEVICES MAY BE
SUBSTITUTED FOR BALANCED
MODULATORS 35, 37
*Fig. 5.*
Inventor
George M. Charrier
C D Tuska
Attorney Patented Sept. 10, 1946

2,407,475

UNITED STATES PATENT OFFICE 2,407,475

CATHODE RAY SWEEP CIRCUIT

George M. Charrier, Collingswood, N. J., assignor to Radio Corporation of America, a corporation of Delaware Application February 25, 1942, Serial No. 432,191

12 Claims. (Cl. 315—24)

This invention relates to cathode ray oscillographs and more particularly to means for producing a cathode ray trace having a circular sweep linear with time, and variable in diameter under control of a source of potential under observation.

The application of deflecting forces in quadrature phase to produce a circular pattern on a cathode ray tube is well known. Such a pattern can provide a cathode beam sweep which is linear with respect to time in contrast to a straight sweep in which the beam executes simple harmonic motion under the influence of sine wave deflecting potentials.

The use of radial deflection of the cathode beam is also well known. This invention contemplates a new and useful method and apparatus whereby phase and amplitude characteristics of a source of signals can be studied and measured. The invention also provides a convenient and accurate method of calibrating the oscillograph.

An object of the invention is to provide means for the use of a standard cathode ray oscillograph tube in which a signal controls the radius of a circular trace by control of the quadrature voltages producing the trace.

Another object of the invention is to provide an oscillograph using a standard tube having only cathode, anode and ray deflecting elements, in which a signal or a calibrating voltage can either increase or decrease the radius of a circular trace, as desired, by simultaneously controlling the voltages applied to the deflecting elements.

Another object of the invention is to provide an oscillograph utilizing a standard cathode ray tube, in which a signal controls the radius of a circular trace by controlling the voltages applied to the tube deflecting elements, without in any way disturbing the cathode ray focus. By control of the frequency producing the circular trace, the pattern can be controlled to provide the most advantageous measurements of the characteristics of the signal under consideration.

Still another object of the invention is to provide an oscillograph, utilizing a standard cathode ray tube, in which a signal controls the phase of a circular trace by controlling the phase quadrature voltages applied to the tube deflecting elements, and in which the control frequency is independent of the characteristics of the phase quadrature circuit.

The invention will be described by reference to the attached drawing. Figure 1 is a schematic diagram of a typical circuit, Figure 2 is an end view of a cathode ray screen showing a typical trace on a cathode ray tube connected as shown in Fig. 1, Figure 3 is a graph illustrating the manner in which the trace is controlled in the two positions of switch S1 in the circuit of 1, Figure 4 is a schematic diagram of a circuit employing another embodiment of the invention, and Figure 5 is an end view of a cathode ray screen showing a typical trace obtainable with the circuit of Figure 4. Similar reference characters are applied to similar elements in the drawing.

Referring to Fig. 1, the circuit consists of a source of alternating voltage shown as an oscillator of conventional design, the output of which is connected through a conventional filter circuit 3 to remove substantially all harmonics. Any other source of sinusoidal currents could be used.

The source of sinusoidal voltage is connected to the input of a conventional variable gain amplifier 5 through the blocking condenser C1. The output of the amplifier is connected directly to one pair of deflecting elements 6, 6' of a standard cathode ray oscillograph tube T2. The output of the amplifier is also connected through a suitable phase quadrature circuit 9 to another pair of deflecting elements 7, 7' of tube T2. Such an arrangement provides quadrature phase forces for producing a circular cathode ray trace. The speed of rotation of the cathode ray is directly proportional to the frequency of the source of sinusoidal voltage and the radius of the circle is proportional to the voltage amplitude applied to the deflecting plates. The radius can, therefore, be controlled manually for calibration purposes by the potentiometer R1 which regulates the input to the variable gain amplifier.

The source of signals E, to be measured, is also connected to the input of the variable gain amplifier, in such a way that the signals may control the gain of the amplifier and thereby control the radius of the circular trace on cathode ray tube T2.

In practice the D.-C. component of the signal source is used for this control of the amplifier gain. In the particular circuit disclosed, the source of signals is a conventional radio receiver 11, the output of which is connected through a blocking condenser C2 and diode rectifier T1 to the input of the variable gain amplifier. The rectified output of the second detector of a superheterodyne receiver, or any other desired signal source may be used to control the amplifier gain.

The double pole-double throw switch S1 having positions A and B is intended for providing either expansion or contraction of the oscillograph trace with an increase of signal amplitude from the radio receiver. The battery C and switch S2 are intended for calibration purposes only.

Figure 2 is an end view of the fluorescent screen 21 of the oscillograph tube T2. The indicia 22 are provided to show angle of rotation and the concentric lines 23 indicate radial distances from the center 24. A typical trace of the cathode beam, shown at 25, will depend in size and shape on the signal source characteristics, the frequency and amplitude of the oscillator and the setting of potentiometer R1.

Figure 3 shows typical curves of the radius of the trace on the oscillograph tube with variation of the control voltage E for positions A and B of switch S1.

The circuit of Fig. 4 provides a means of producing on the fluorescent screen of a conventional cathode ray oscillograph, a trace having a reference circle of any desired radius, with radial indicia produced by the cathode ray. This circuit has the added advantage of providing satisfactory indications of received pulses of extremely short duration.

The response of the circuit of Fig. 1 is limited by the time constant of the phase shifting circuit, thereby preventing satisfactory measurements of pulses of high frequency or short duration.

In the circuit of Fig. 4 the phase shifting circuit 39 is in the low frequency or oscillator output circuit, and is not required to pass the high frequency pulses under measurement.

In Fig. 4, a conventional source of sinusoidal oscillations 31, 33 is connected through a first balanced modulator 37 to the cathode ray deflecting elements 7, 7' of a conventional type oscilloscope T2. The source of sinusoidal oscillations 31, 33 is also connected through a phase quadrature circuit 39 and a second balanced modulator 35 to the cathode ray deflecting elements 6, 6' of the tube T2. This arrangement provides a circular cathode ray oscillograph trace, the radius of which is determined by the voltages on the deflecting elements.

The amplitude of the individual phases of the deflecting voltages is controlled by simultaneously varying the bias on both of the balanced modulators. The bias is varied by the rectified output of a radio receiver 41, or other source of signals to be measured. Battery 47 provides normal bias in these circuits.

To provide the angular indicia on the oscilloscope, timing pulses applied to the modulator bias circuit at terminals 49 can, at desired intervals, reduce the circular trace diameter. These timing pulses are of extremely short duration and can be derived, in any conventional manner, from a selected harmonic of the source of sinusoidal oscillations. One method of producing such pulses is described in U. S. Patent 2,105,870 to A. W. Vance.

The rectified signal pulses can then be applied to the modulator bias circuit, in opposite polarity, to the timing pulses, to increase the circular trace diameter to produce the signal trace marks. The angular dimension or thickness of the signal trace mark will be dependent on its duration.

The balanced modulators of Fig. 4 are a preferred embodiment since such circuits permit adequate control of scanning voltage amplitude by the control pulse without undesirable reaction to the source of pulse signals. However, two variable gain amplifiers of the type in the circuit of Fig. 1, or any other suitable voltage multiplying devices, may, in the absence of reaction, be substituted for both of the balanced modulators of Fig. 4.

The amplifiers 43 and 45 between the modulators 35 and 37 and the oscilloscope T2 are optional. The voltage divider R2 permits the voltage from the sinusoidal oscillator source 31, 33 to be equalized at the input circuits of both modulators.

Figure 5 is an end view of the oscilloscope screen 51, having the circular reference trace 52, the angular or timing indicia 53 and the signal pulse indicia 54, all produced by the operation of the circuit of Fig. 4 which has been described in detail.

A suitable frequency should be selected for the source of sinusoidal potential to provide a useful pattern for measurement of the signal source under consideration. If the frequencies of the source and signal are related, their relative phase may be determined.

I claim:

1. In a cathode ray oscillograph, a cathode ray tube having deflecting elements, a source of potential, a source of quadrature voltages, means for applying said quadrature voltages to said deflecting elements to produce a circular trace, and means for varying the radius of said circular trace comprising a common variable gain amplifier to control the amplitude of both of said quadrature voltages, and means for controlling the gain of said amplifier by said source of potential.

2. In a cathode ray oscillograph, a cathode ray tube having deflecting elements, a source of signals, a source of quadrature voltages, means for applying said quadrature voltages to said deflecting elements to produce a circular trace, means for varying the radius of said circular trace comprising a common variable gain amplifier to control the amplitude of both of said quadrature voltages, and means for controlling the gain of said amplifier by said source of signals.

3. In a cathode ray oscillograph, a cathode ray tube having deflecting elements, a source of signals, a rectifier for said signals, a source of quadrature voltages, means for applying said quadrature voltages to said deflecting elements to produce a circular trace, means for varying the radius of said circular trace comprising a common variable gain amplifier to control the amplitude of both of said quadrature voltages, and means for controlling the gain of said amplifier by D.-C. potentials derived from the rectified output of said source of signals.

4. In a cathode ray oscillograph, a cathode ray tube having deflecting elements, a source of signals, a rectifier for said signals, a source of quadrature voltages, means for applying said quadrature voltages to said deflecting elements to produce a circular trace, means for varying the radius of said circular trace comprising a common variable gain amplifier to control the amplitude of both of said quadrature voltages, and means for controlling the gain of said amplifier by D.-C. potentials of either polarity derived from the rectified output of said source of signals.

5. In a cathode ray oscillograph, a cathode ray tube having deflecting elements, a source of signals, a rectifier for said signals, a source of quadrature voltages, applying said quadrature voltages to said deflecting elements to produce a circular trace, means for varying the radius of said circular trace comprising a common variable gain amplifier to control the amplitude of both of said quadrature voltages, means for controlling the gain of said amplifier by D.-C. potentials of either polarity derived from the rectified output of said source of signals, and means for calibrating said oscillograph comprising known potentials selectively connected to the input of said amplifier.

6. In a cathode ray oscillograph, a cathode ray tube having deflecting elements, a source of signals, a rectifier for said signals, a source of quadrature voltages, means for applying said quadrature voltages to said deflecting elements to produce a circular trace, means for varying the radius of said circular trace comprising two balanced modulators, one for each of said quadrature voltages, and means simultaneously to vary the D.-C. bias on both of said modulators by D.-C. potentials derived from the rectified output of said source of signals.

7. In a cathode ray oscillograph, a cathode ray tube having deflecting elements, a source of signals, a source of quadrature voltages, a source of timing pulses, means for applying said quadrature voltages to said deflecting elements to produce a circular trace, means for varying the radius of said circular trace comprising two variable gain amplifiers, one for each of said quadrature voltages, and means simultaneously to vary the gain of both of said amplifiers by said source of signals and said source of timing pulses.

8. In a cathode ray oscillograph a cathode ray tube having deflecting elements, a source of signals, a source of quadrature voltages, a source of timing pulses, means for applying said quadrature voltages to said deflecting elements to produce a circular trace, means for varying the radius of said circular trace comprising two balanced modulators, one for each of said quadrature voltages, and means simultaneously to vary the bias on both of said modulators by said source of signals and said source of timing pulses.

9. In a cathode ray oscillograph, a cathode ray tube having deflecting elements, a source of signals, a rectifier for said signals, a source of quadrature voltages, means for applying said quadrature voltages to said deflecting elements to produce a circular trace, means for varying the radius of said circular trace comprising two variable gain amplifiers, one for each of said quadrature voltages, and means simultaneously to vary the D.-C. bias on both of said variable gain amplifiers by D.-C. potentials derived from the rectified output of said source of signals.

10. In a cathode ray oscillograph, a cathode ray tube having deflecting elements, a source of signals, a rectifier for said signals, a source of quadrature voltages, means for applying said quadrature voltages to said deflecting elements to produce a circular trace, means for varying the radius of said circular trace comprising two voltage multiplying devices, one for each of said quadrature voltages, and means simultaneously to vary the D.-C. bias on both of said voltage multiplying devices by D.-C. potentials derived from the rectified output of said source of signals.

11. In a cathode ray oscillograph, a cathode ray tube having ray deflecting means, a source of signals, a rectifier for said signals, a source of quadrature voltages, means for applying said quadrature voltages to said ray deflecting means to produce a circular cathode ray trace, means comprising at least one voltage multiplying device for varying the radius of said circular trace, and means for applying rectified signals derived from said rectifier to vary the D.-C. bias on said voltage multiplying device.

12. In a cathode ray oscillograph, a cathode ray tube having ray deflecting means, a source of signals, a rectifier for said signals, a source of quadrature voltages, means for applying said quadrature voltages to said ray deflecting means to produce a circular cathode ray trace, means comprising at least one variable gain amplifier for varying the radius of said circular trace, and means for applying rectified signals derived from said rectifier to vary the D.-C. bias on said variable gain amplifier.

GEORGE M. CHARRIER.